(No Model.)  5 Sheets—Sheet 1.

C. E. WOODS.
MOTOR VEHICLE.

No. 585,371.  Patented June 29, 1897.

WITNESSES:  INVENTOR
Bertha C. Sims  Clinton E. Woods.
Donald M Carter  BY Francis W. Parker,
 ATTORNEY.

THE NORRIS PETERS CO., PHOTO-LITHO., WASHINGTON, D. C.

(No Model.)

C. E. WOODS.
MOTOR VEHICLE.

No. 585,371.

5 Sheets—Sheet 2.

Patented June 29, 1897.

WITNESSES:

INVENTOR
Clinton E. Woods,
BY
Francis W. Parker,
ATTORNEY.

(No Model.)   C. E. WOODS.   5 Sheets—Sheet 3.
MOTOR VEHICLE.
No. 585,371.   Patented June 29, 1897.

(No Model.)

C. E. WOODS.
MOTOR VEHICLE.

No. 585,371.  Patented June 29, 1897.

5 Sheets—Sheet 5.

WITNESSES:  INVENTOR
  Clinton E. Woods,
  BY
  ATTORNEY.

UNITED STATES PATENT OFFICE.

CLINTON E. WOODS, OF CHICAGO, ILLINOIS, ASSIGNOR TO THE AMERICAN ELECTRIC VEHICLE COMPANY, OF SAME PLACE.

MOTOR-VEHICLE.

SPECIFICATION forming part of Letters Patent No. 585,371, dated June 29, 1897.

Application filed May 8, 1896. Serial No. 590,710. (No model.)

*To all whom it may concern:*

Be it known that I, CLINTON E. WOODS, a citizen of the United States, residing at Chicago, in the county of Cook and State of Illinois, have invented certain new and useful Improvements in Electric Vehicles, of which the following is a specification.

My invention relates to power-vehicles, and particularly to what is known as "horseless" vehicles, and especially to that class of horseless vehicles which are driven by electric power.

My drawings illustrate an electrically-driven vehicle, the power being furnished from a storage battery carried by the vehicle itself. It will be understood, of course, that many of the features which I describe and which I have illustrated are applicable in other connections and have separately a value in connection with the vehicle, so that I do not wish to be understood as attempting here to describe the whole application of any particular feature, but I have assembled these several features in a single complete vehicle which for my present purposes seems to express in the best manner the utility, the function, and the office of the several novel features which I have incorporated in this complete device.

As above suggested, I have shown my invention as applied to an electrically-driven vehicle which carries its own storage batteries and is provided with suitable running-gear and in this case has two motors, and this application of my invention I have illustrated in the accompanying drawings, wherein—

Figure 1:
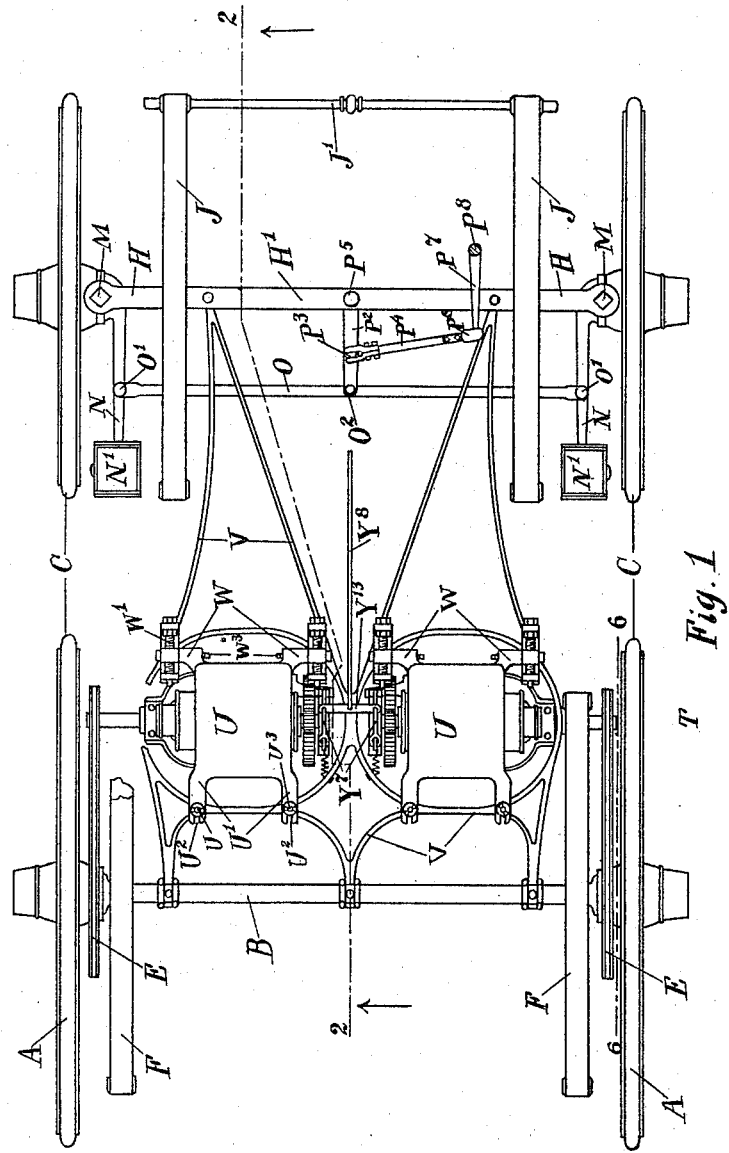
Figure 2:
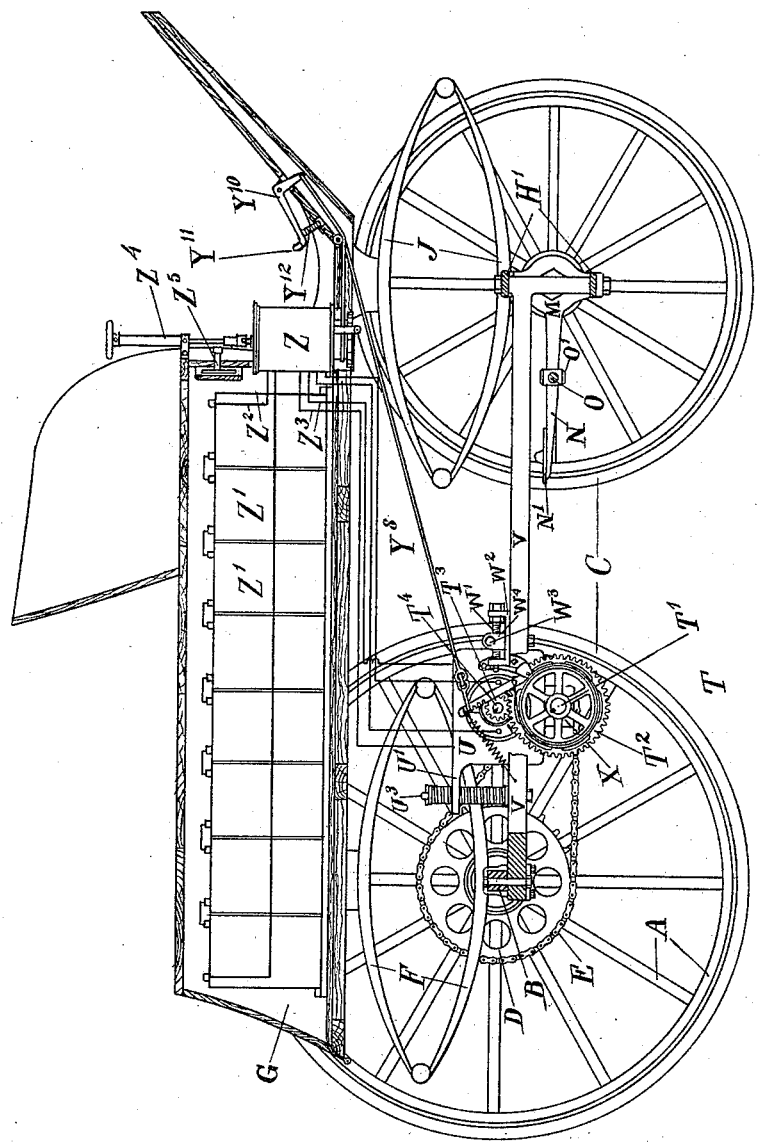
Figure 3:
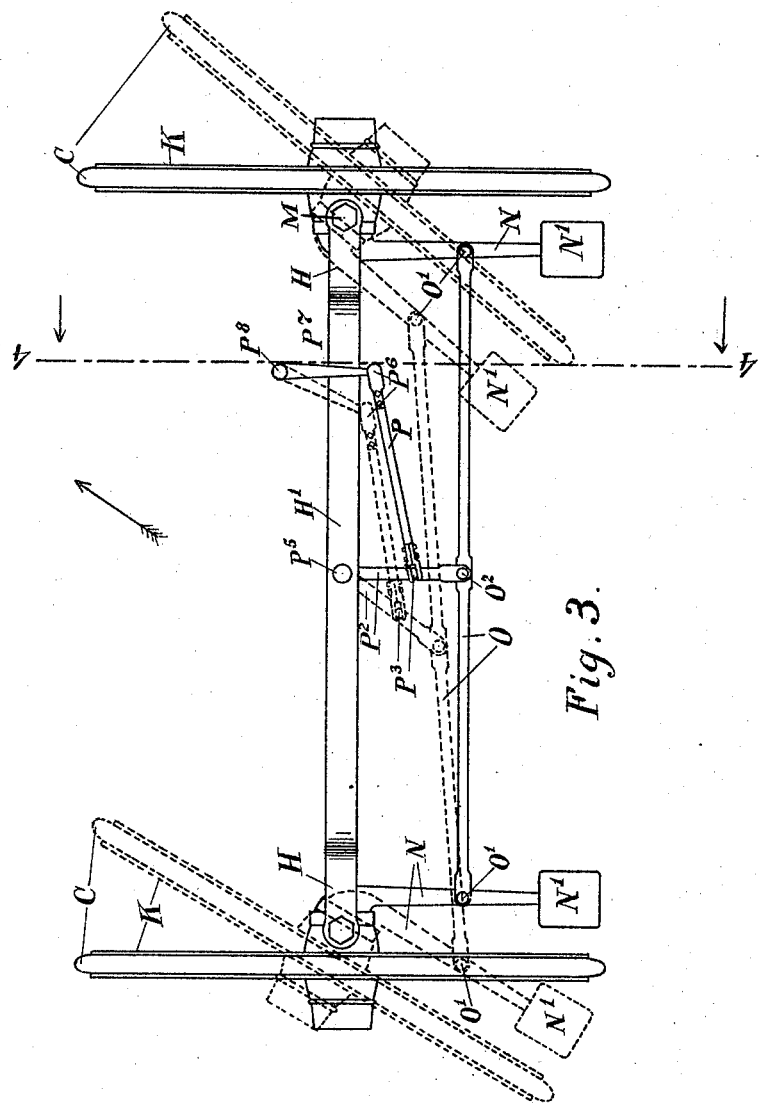
Figure 4:
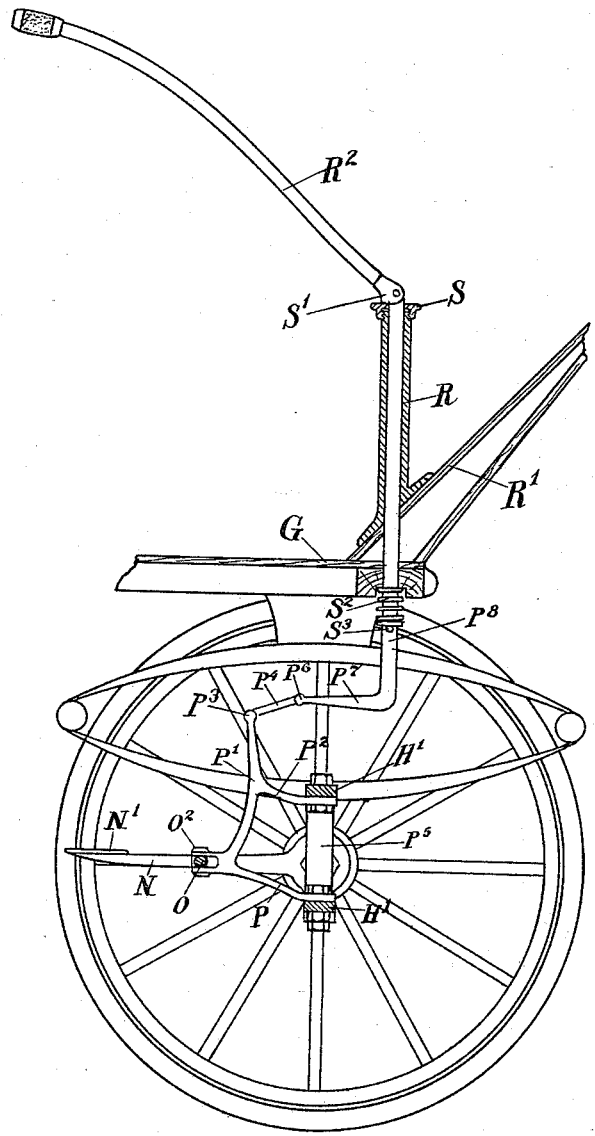
Figure 8:
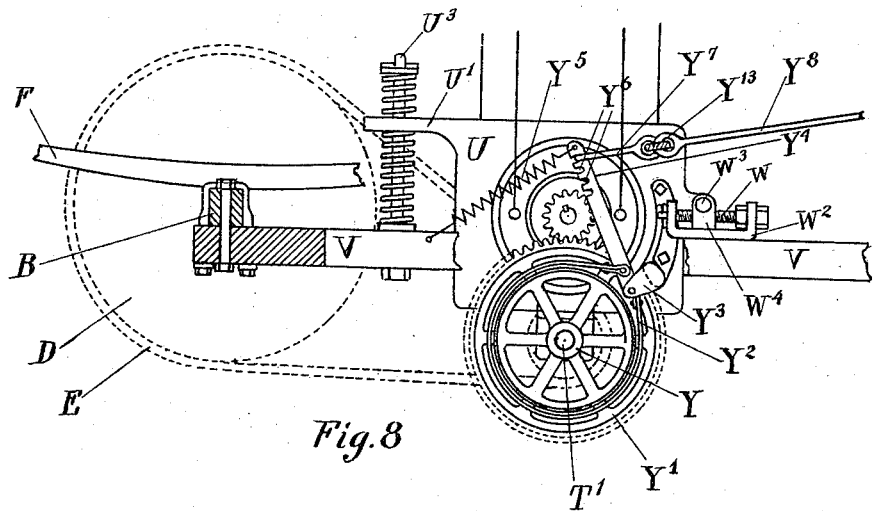
Figures 5, 7:
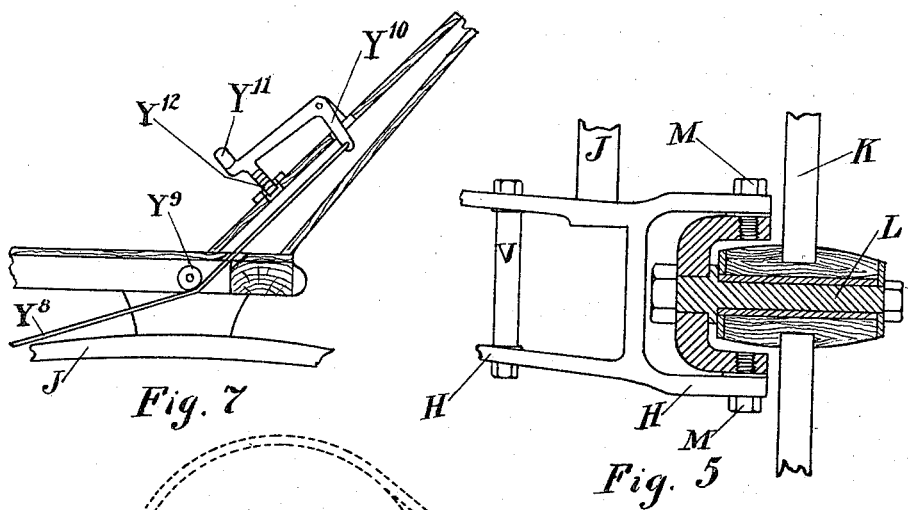
Figure 6:
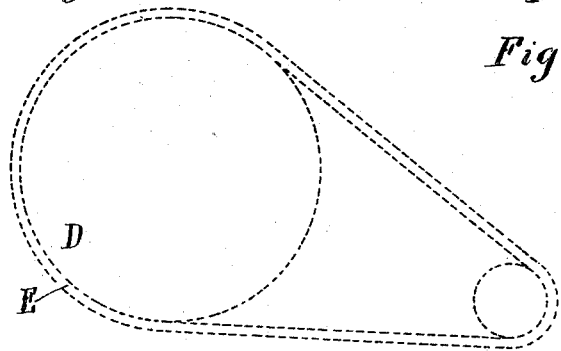

Figure 1 is a plan view of the wheels, running-gear, and motor with certain parts broken away. Fig. 2 is a vertical longitudinal section on the line 2 2, Fig. 1. Fig. 3 is a plan view of the steering mechanism, showing the parts by dotted lines in two different positions. Fig. 4 is a section on the line 4 4 of Fig. 3. Fig. 5 is a detail sectional view of the forward axle and wheel at the point where it is mounted on the axle. Fig. 6 is a detail view on the line 6 6, Fig. 1. Fig. 7 is a detail of the brake-controlling device. Fig. 8 is an enlarged detail view of the motor and associated parts.

Like parts are indicated by the same letter in all the figures.

A A are the rear wheels, journaled on the axle B in the usual manner, and in this case preferably by means of ball-bearings, and they are also preferably provided with the elastic tires C C. Secured to the wheels A A, and preferably secured concentrically thereto on the hub thereof, are sprocket-wheels D, from which the driving-chains E run. These sprocket-wheels may be secured to the rear wheels of the device in any desired and convenient manner, either to the hubs or to the spoke or indirectly secured thereto, if in any given arrangement of parts that should seem necessary or desirable. Mounted upon this rear axle are the springs F F, which carry the body G of the vehicle. The forward axle is composed of the two end pieces H H and the two central vertically-separated portions H' H'. The forward springs J J are mounted on this axle and may be connected by the ornamental brace J'. On them rests the forward end of the vehicle-body G.

The forward wheels K K are mounted on the short axles L, which project laterally from the piece M, which is pivoted in the separated ends of the axle H, so that the wheel not only rotates on its axis, but is also free to swing about this vertical pivot around the end of the principal axle. Projecting from the vertical pivot-piece M toward the rear, as indicated in Fig. 3, is the bar N, at the extremity of which is the step N'. This bar is preferably formed continuous with the vertical piece M. The two bars are connected with the rod O by the pivotal connections O' O', so that when either is moved both are moved in the same direction. Midway of this rod O is a connection $O^2$, which connects the bar with a piece having the following parts: P, which is carried down so as to rest on the lower portion of the axle H', and the part P', which bends upwardly and has a lateral extension $P^2$, which passes underneath the upper part of the axle portion H'. The part P' is carried still higher and is connected at $P^3$ with the rod $P^4$. The two parts $P^2$ and P' are pivotally secured to the axle by means of the vertical bolt $P^5$, which passes through their extremities and through the two separated portions of the axle H H, about midway between the two forward wheels. The rod $P^4$ is connected at $P^6$ with the arm $P^7$, which projects laterally from the vertical rod $P^8$. This rod passes up through the body of the vehicle and preferably into the tubular stand R, which rises from near the dashboard R', and it is connected at its upper end with the handle $R^2$, whereby it may be turned about its vertical axis to steer the vehicle. A screw-threaded adjustable cap S covers the top of the stand and forms a bearing for the eccentric portion S' on the handle $R^2$.

$S^2$ is a spiral spring which encircles the rod and bears upwardly against the bottom of the vehicle and downwardly against the pin $S^3$ through the rod. Thus by adjusting the cap S properly the spring $S^2$ will exert a considerable downward pressure to bear the eccentric portion S' against the top of the cap and thus securely fasten the parts in whatever position they are left. In other words, it is a sort of friction-lock and seems to be sufficient, though slots or notches to receive the eccentric portion could be employed, if found necessary, or any other locking device could be used. Now when the steering is to be done it is only necessary to slightly raise the handle, so as to release this friction-lock, and then move it to either side, thus rotating the rod $P^8$ and through the mechanism above described turning the wheels, for example, into the position indicated in dotted lines in Fig. 3.

It will be observed that the vertical axes of the part M at the extremities of the principal forward axle are separated from each other by a greater distance than the pivot-points O' O' of the rod O, which lie parallel with such principal axle and connect the parts N N. This results in what is illustrated in Fig. 3—that is, that the forward wheel on the side toward which the vehicle is being directed is turned through a greater angle than the opposite wheel, so that it describes a smaller circle than in the case of a vehicle having a central pivoted forward axle on which the wheels are journaled.

The driving-chains E encircle each a sprocket-wheel T, which is on the end of one of the motor-shafts T'. This motor-shaft carries a gear-wheel $T^2$, which meshes with a pinion $T^3$ on the armature-shaft $T^4$, and thus motion is transmitted from the armature-shaft through the gear-wheels to the motor-shaft and through the sprocket-chain or driving-chain to the rear wheel.

U U are the field-magnets, which are supported at the rear by the projecting arms U' U', slotted at $U^2$ to receive the vertical bolts $U^3$, which are mounted upon the frame V. The bolt $U^3$ is surrounded by spiral springs, one above and the other below the arm U', so that the motor at this point is spring suspended and supported, so that a tendency of that end of the motor to move in either direction is resisted by the action of the springs.

At the forward end of each motor is a laterally and forwardly projecting arm W, through which passes the adjusting screw-bolt W', which passes through a block $W^2$, to which the part W is pivotally connected by the pivot-pin $W^3$. The bolt W' is mounted in a U-shaped piece $W^4$, which is itself fixed on the frame. Thus by rotating this bolt the motor may be moved back and forth, and at the same time it has an elastic rear motion about its supporting pivot-pins $W^3$. The motor-shaft is supported in bearings Y on the lower portion of the field-magnet U or otherwise secured so that the pinion and cog retain their relative arrangement. On the motor-shaft T' is placed the brake-wheel Y', encircled by the brake-strip $Y^2$, which is secured to the piece $Y^3$ on the motor-frame U at one end, and is secured at the other end to the lever $Y^4$, pivoted on the piece $Y^3$ on the motor-frame. The other end of this lever is normally drawn down by the spring $Y^5$ to loosen the tension of the strap on the wheel and is adjustably attached by means of the slots $Y^6$ to the link $Y^7$, secured to the rod or chain $Y^8$, which rod or chain passes over the idler $Y^9$ and thence up to the end of the elbow-crank lever $Y^{10}$ underneath the dashboard. The other end of this elbow-crank lever terminates in the foot-piece $Y^{11}$, which is adapted to move freely along a notched bar $Y^{12}$, in the notches of which it may be engaged to hold it in any desired position.

In Figs. 2 and 8 but a single brake is shown.

In Fig. 4 it will be seen that there are two sets of brakes.

Z is the controller device which controls the application of electricity to the motor and is connected with the batteries Z' Z' by means of the wires $Z^2$ $Z^2$ and with the motor by means of the wires $Z^3$. The controller itself is operated by means of the controller-handle $Z^4$ and is provided with the reversing-switch $Z^5$. The controller and its associated parts are not the subject of this application and are therefore simply shown diagrammatically, as it were, for the purpose of exhibiting the entire device and not with a view to showing any of the details or features of that portion of the vehicle.

The several parts which I have described and shown, as previously suggested, are not necessarily made always in the precise forms here shown, neither is it necessary that they should assume the precise relations, and it is obvious that some of these features can be moved without moving the others and that the construction of the complete device may be varied in that respect. Thus some of the elements or features or constructions which I employ might be used in a different sort of vehicle with association with the other parts with which I have here shown them associated.

The use and operation of my invention have been sufficiently revealed by the description which has gone before, but I may, perhaps, profitably describe in more general terms the action of the several most important features.

The steering mechanism is shown quite fully in Figs. 3, 4, and 5, as well as elsewhere. The wheels are journaled on their horizontal axles, which in turn are supported at the ends of the forward axle of the vehicle on vertical pivots. Thus the wheels while rotating in the usual manner at the extremities of their associated axle are also free to be turned about its vertical pivot. To secure simultaneous action, the two wheels, or rather their supporting-axles, are associated together by a rod which when moved moves them both, and thus they are both turned in the proper direction. In order to make the inner wheel describe the lesser circle and facilitate the turning, these axles are connected by a line shorter than the distance between the two vertical pivots, and this distance in connection may be varied to suit the designer or the necessities of the particular vehicle. Obviously when so constructed the operation of the steering mechanism is to give the inner wheel a much more rapid motion and to turn it through a greater arc about its pivot as a center. This is plainly illustrated in Fig. 3. Now all that is necessary is to connect these two axles or their connecting-bars to convenient suitable rods and the lock to a handle which is within the reach of the operator. To give security to these several parts and furnish suitable bearings for them, the forward axle is composed, practically, of two portions, which are separated from each other, so that it has great vertical width compared with its thickness, and between these parts the vertical pivots are mounted and also the central pivot, by means of which the steering-rod is pivotally connected with the axle. The handle may of course be locked in any convenient manner, but the frictional lock which I have exhibited is very desirable, for it avoids the danger of accident.

In a vehicle of this kind everything must unite to make the operation of the device safe in the hands even of an inexperienced person. When, therefore, it becomes necessary quickly to turn the vehicle, an excited person can do so by simply pressing the handle to the proper side and no damage can ensue, though a careful or experienced person will raise the handle and thus release the friction-lock, whereupon he can easily effect the steering of the vehicle. A lock, therefore, which, while it locks the wheels in any predetermined position, is nevertheless so constructed that without any special release of any of its parts it will still permit the device to be operated is highly important, and I have shown it in the particular form of my so-called "friction-lock."

Referring now to the driving mechanism, we find that it consists of two motors mounted in the midst of a frame in such a manner that each motor is adjustable longitudinally with the frame or so as to tighten or loosen the driving-chains, and that each also is pivotally supported at one end and elastically supported at the other end, so that it has a motion to relieve it from the jar incident to the use of the vehicle on rough roads and pavements and also to enable it to give somewhat when started. The upper spring takes the strain at starting and the lower spring takes most of the strain incident to the jolting or jarring. The motor-shaft, as well as the armature-shaft, being rigidly supported on the field-magnet or field-magnet frame in such manner as has been suggested is not sufficient to interfere in any manner with the operation of the device. The motors are capable of operating together or either separately, and each through its proper connections is adapted to drive its associated wheel, which wheel is rotatably mounted at the extremity of the rear axle.

The frame consists, as shown, of several bars and parts which are rigidly secured to the front and rear axles, and thus hold them in rigid relation, the body of the vehicle being supported by suitable springs on such axles.

The brake mechanism has been sufficiently described. It consists of two strap brakes or straps encircling brake-wheels on the respective motor-shafts and means whereby while these straps are normally kept loosened they may be tightened simultaneously through an equalizer or evener to clamp the motor-shaft and stop the mechanism. The application of a brake to the wheel with its elastic tire is of course impracticable.

I claim—

1. A steering device for vehicles containing a rotating bar, a handle eccentrically secured to said bar, and a spring which tends to draw the handle from the bar so that the eccentric portion is frictionally forced against a platform to frictionally lock the parts in any desired position.

2. A steering mechanism for vehicles containing a vertical rod, a platform which surrounds one end of it, a handle eccentrically pivoted to the same end of said rod outside of said platform, a spring on the opposite side of the platform which tends to draw the rod away from the handle.

3. In a vehicle, the combination of a fixed axle with a short horizontal vertically-pivoted axle at the end, an arm projecting from the same, a steering connecting-rod attached to said arm and a step also attached to said arm.

4. In a vehicle the combination of the rigidly-fixed frame with a motor secured thereon at one end so as to have vertical and longitudinal motion and pivoted at the other end.

5. In a vehicle the combination of a rigidly-fixed frame with a motor secured thereon at one end between springs and so as to have a longitudinal motion and pivoted at the other end.

6. In a vehicle the combination of a rigidly-fixed frame with a motor suspended at one end on a longitudinally-adjustable pivot and at the other end on a spring-support.

7. In a vehicle the combination of a rigidly-supported frame with a motor secured thereon at one end by longitudinally-adjustable pivots and at the other end between springs and so as to have a longitudinal motion.

8. In a vehicle the combination of two motors with separate braking devices, a single brake-controlling device and an evener or equalizer whereby the one controller is connected with the two brakes.

CLINTON E. WOODS.

Witnesses:
DONALD M. CARTER,
BERTHA C. SIMS.